(12) United States Patent
Plataret et al.

(10) Patent No.: US 8,826,763 B2
(45) Date of Patent: Sep. 9, 2014

(54) OFF-CENTRED PUSHER DEVICE FOR STEERING AN AUTOMOBILE

(75) Inventors: Nicolas Plataret, Lyons (FR); Patrice Brochot, Oullins (FR)

(73) Assignee: JTEKT Europe (FR)

( * ) Notice: Subject to any disclaimer, the term of this patent is extended or adjusted under 35 U.S.C. 154(b) by 305 days.

(21) Appl. No.: 13/128,065

(22) PCT Filed: Oct. 29, 2009

(86) PCT No.: PCT/FR2009/052094
§ 371 (c)(1),
(2), (4) Date: Jul. 15, 2011

(87) PCT Pub. No.: WO2010/052412
PCT Pub. Date: May 14, 2010

(65) Prior Publication Data
US 2011/0265591 A1 Nov. 3, 2011

(30) Foreign Application Priority Data
Nov. 6, 2008 (FR) ..................................... 08 06207

(51) Int. Cl.
*F16H 55/56* (2006.01)
*B62D 3/12* (2006.01)
*F16H 55/28* (2006.01)

(52) U.S. Cl.
CPC .............. *F16H 55/283* (2013.01); *B62D 3/123* (2013.01)
USPC ............. 74/388 PS; 74/409; 74/422; 180/444

(58) Field of Classification Search
CPC ............ F16H 55/283; F16H 2055/281; F16H 2057/126; B62D 3/12; B62D 3/123
USPC ........ 74/422, 338 PS, 409, 411, 406, 388 PS; 180/428, 444; 280/93.514
See application file for complete search history.

(56) References Cited

U.S. PATENT DOCUMENTS 3,820,415 A * 6/1974 Cass ................................ 74/498
4,534,577 A * 8/1985 Howard ........................ 180/400
(Continued)

FOREIGN PATENT DOCUMENTS

EP   0770538 EP    5/1997
FR   2219868 A     9/1974

OTHER PUBLICATIONS

International Search Report PCT/FR2009/052094; Dated Jan. 27, 2010.

*Primary Examiner* — Troy Chambers
*Assistant Examiner* — Gregory Prather
(74) *Attorney, Agent, or Firm* — Cantor Colburn LLP

(57) ABSTRACT

The invention relates to a pusher device (8) that includes a rotary bearing (10) having an inner periphery (11) that is off-center relative to the outer periphery (12). In order to compensate for wear, the bearing (10) is rotationally urged in one direction (F) by a spring (10) and is thus pressed against the back (9) of a rack (3) that is then pushed back against the teeth of the steering sprocket (5). The rotary bearing (10) is rotatingly mounted in a housing (13) that is in turn mounted on a steering casing (2) so as to be capable of sliding in a direction (B) parallel to a plane (P) of the teeth (6) of the rack (3) and orthogonal to the axis (A) of said rack. Shock-absorbing spring means (20, 21) are arranged between the sliding housing (13) and the steering casing (2) for absorbing the straightness defects of the rack (3).

9 Claims, 2 Drawing Sheets

(56) References Cited

U.S. PATENT DOCUMENTS

| | | | |
|---|---|---|---|
| 4,841,798 A * | 6/1989 | Porter et al. | 74/501.5 R |
| 5,778,731 A * | 7/1998 | Heep | 74/498 |
| 6,247,375 B1 * | 6/2001 | Gierc et al. | 74/388 PS |
| 6,357,313 B1 * | 3/2002 | Appleyard | 74/388 PS |
| 7,228,761 B1 * | 6/2007 | Chen | 74/594.7 |
| 7,360,634 B2 * | 4/2008 | Gadelius et al. | 192/45.1 |
| 7,980,152 B2 * | 7/2011 | Arlt | 74/422 |
| 8,181,549 B2 * | 5/2012 | Watanabe et al. | 74/458 |
| 8,272,814 B2 * | 9/2012 | Buttrick et al. | 408/115 R |
| 8,336,413 B2 * | 12/2012 | Dodak et al. | 74/388 PS |
| 2007/0000341 A1 * | 1/2007 | Arlt et al. | 74/409 |
| 2011/0303034 A1 * | 12/2011 | Plataret et al. | 74/409 |
| 2012/0266707 A1 * | 10/2012 | Brochot et al. | 74/409 |

* cited by examiner

OFF-CENTRED PUSHER DEVICE FOR STEERING AN AUTOMOBILE

TECHNICAL FIELD

The present invention generally concerns rack-and-pinion steering systems for motor vehicles. More particularly this invention relates to a pusher device for motor vehicle steering systems. Further particularly it relates to a so-called off-centred pusher device.

BACKGROUND

In most steering systems which currently equip motor vehicles a steering pinion is linked in rotation with a steering column which is operated by means of a steering wheel of the vehicle, often with hydraulic or electric powering. The steering pinion meshes with a rack mounted so that it slides in longitudinal direction inside a steering housing. The two ends of the rack, outside the housing, are respectively coupled with two tie rods which themselves are respectively associated with left and right steerable wheels of the vehicle. Therefore the rotation of the steering wheel in one or other direction transmitted by the steering column to the pinion is converted into corresponding translation of the rack which, via the tie rods, causes directing of the steerable wheels to turn to the right or to the left.

In said steering system, the rack-and-pinion mechanism, linked to the front drive train of the vehicle, via the tie rods, is subjected to upward forces, impacts and vibrations depending on the state of the roadway on which the vehicle is travelling. On account of the angle formed by the tie rods with the rack, forces may be exerted on the rack which may move it away from the pinion. For this reason, the rack is usually applied permanently against the pinion by means of a device called a pusher which acts elastically on the back of the rack in the region of the pinion to press the teeth of this rack strongly against the pinion. The pusher therefore limits any play between the respective teeth of the pinion and rack, and this pusher also provides control over the sliding force of the rack inside the housing. The action of the pusher also allows compensation for any straightness defects of the rack.

In its most frequent embodiment, the pusher device comprises the actual pusher which is a rigid part mounted mobile in translation in a direction substantially perpendicular to the longitudinal axis of the rack, and urged towards the back of the rack by spring means which are also arranged in a direction substantially perpendicular to the longitudinal axis of the rack.

On the contrary, with a so-called off-centred pusher device such as described in patent U.S. Pat. No. 6,247,375 B1 (or in patent documents FR 2219868 and EP 0770538 A2), a rotatable yoke comprises an eccentric part which pushes the rack towards the pinion, the rotatable yoke being mounted in rotation in a housing such as a pinion housing around an axis parallel to the longitudinal axis of the rack. The inner periphery of this yoke is eccentric relative to its outer periphery so that when it rotates in the housing its eccentric part is applied against the back of the rack and presses it towards the teeth of the pinions so that they remain meshed. The yoke is urged in rotation in one direction by a spring (see in particular the above-cited document FR 2 219 868) so as to make up for any play caused by assembly imprecision and by wear between the teeth of the rack and the teeth of the pinion.

With regard to above-mentioned patent U.S. Pat. No. 6,247,375 B1, the inner part of the rotatable yoke comprises a recess in which a plate spring is mounted which bears against the rack and therefore allows slight radial movement to offset straightness defects of the rack.

The advantages of an eccentric pusher device particularly lie in the compactness of said device and in the fact that it can be made irreversible, any backward return of the rotatable support (when a certain angle position is reached) being made impossible.

However, in the arrangement according to patent U.S. Pat. No. 6247375 B1, the fact that the plate spring is placed between the rotatable yoke and the rack means that when the rack is subjected to variable forces it does not always bear in similar manner upon the spring, which may cause losses of contact between the said spring and the rack. In addition, the plate spring changes position over time having regard to the progressive rotation of the yoke, which causes variation in the orientation and intensity of the forces applied to the rack. This may all lead to strong degradation of the function performed by the off-centred pusher device.

BRIEF SUMMARY

The present invention sets out to remedy these drawbacks, hence to improve the functioning of an off-centred pusher device for rack-and-pinion steering, through better control over the movements and positions of the members of the pusher device.

For this purpose, the subject of the invention is an off-centred pusher device for the rack-and-pinion steering of a motor vehicle, a device which in manner known per se comprises a rotary support whose inner periphery is eccentric relative to the outer periphery, said support being urged in rotation in an elastic element and being designed so that it can be applied via its eccentric inner periphery against the back of the rack so as to press it towards the teeth of the steering pinion, this off-centred pusher device essentially being characterized by the fact that the rotary support is rotatably mounted in a casing itself mounted slidingly in a direction substantially parallel to the plane of the teeth of the rack and orthogonal to the longitudinal axis of this rack, the elastic element being arranged between the wall of the sliding casing and said rotary support with eccentric inner periphery to urge this support in rotation in a predefined direction, and other elastic means with damping effect being arranged between the sliding casing and a fixed element such as the steering housing, to act on said casing preferably in all directions relative to the rack.

Therefore, the principle of the invention is to separate the function compensating for play due to assembly and wear, which is ensured by the eccentric support itself, from the function of absorbing straightness defects of the rack and optionally of the pinion, which is ensured by the translational movement of the casing subjected to the action of damping spring means which themselves bear upon the housing. This separation of the two functions particularly provides for good guidance of the rack resting directly on a rigid support with an eccentric part. It also limits the causes of degraded irreversibility of the pusher device by stabilising the bearing points of the rotary support.

The spring means which urge said rotary support in rotation are arranged here between this rotary support and the sliding casing; they assume the form of an elastic element which advantageously can be formed of a compression spring of which one end bears upon the inner wall of the sliding casing and whose other end is engaged with a stud pin secured to a radial arm itself secured to the rotary support with eccentric inner periphery.

The elastic means with damping effect arranged between the sliding casing and the steering housing, can be formed of at least one O-ring, in particular of two O-rings, respectively mounted in corresponding annular grooves arranged towards the two ends of the sliding casing.

Advantageously, the rotary support with eccentric inner periphery does not completely surround the rack but has an arched <<wedge-like>> shape. Therefore the entire mechanism remains compact and it can be positioned on the side of the back of the rack directed away from the side of the steering pinion. In addition to the advantages of compactness and savings with said arrangement, it allows the assembly of two bellows seals and two end-of-travel abutments that are identical at each end of the steering housing, whilst not forming any obstacle between the steering pinion and the end-of-travel abutment of the rack.

BRIEF DESCRIPTION OF THE DRAWINGS

The invention will be better understood with the help of the following description with reference to the appended schematic drawing which as an example illustrates one embodiment of this off-centred pusher device for the steering of motor vehicles.

DETAILED DESCRIPTION

Figure 1:
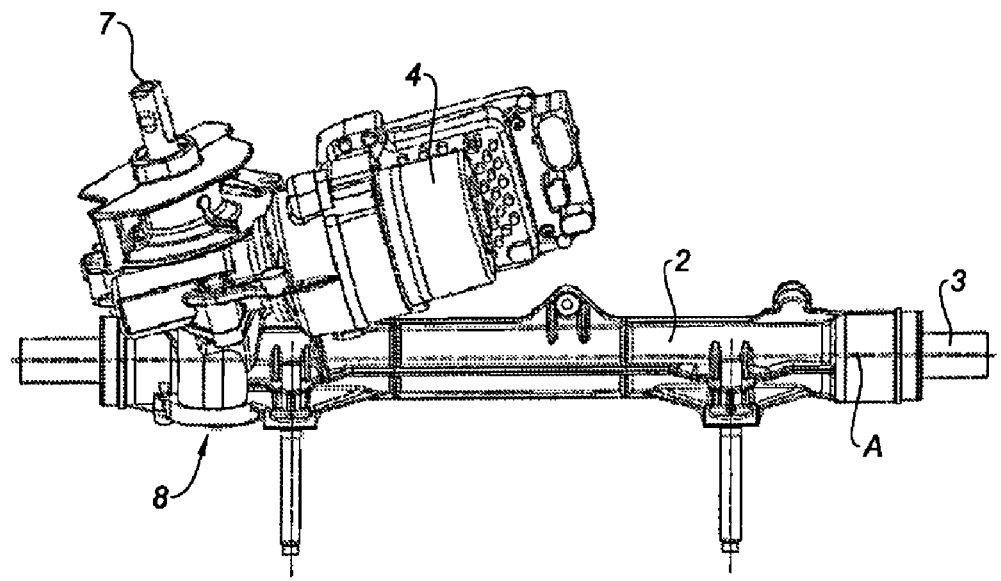
FIG. 1 is a front view of a housing for rack steering and of some adjacent components, said housing possibly being equipped with the off-centred pusher device subject of the invention.

FIG. 1 partly shows a steering system for motor vehicle with its steering housing 2 that extends along a longitudinal axis A, which is also the longitudinal axis of the rack 3 slidingly mounted in the housing 2. In the illustrated example, the steering is electric power steering with an electric motor 4 which is coupled with a steering pinion 5 (see also FIG. 2) meshing with the teeth 6 of the rack 3, the plane of these teeth 6 being indicated by P. The input shaft is referenced 7 to which the steering column (not illustrated) is coupled and operated by means of the steering wheel of the vehicle.

Figure 2:
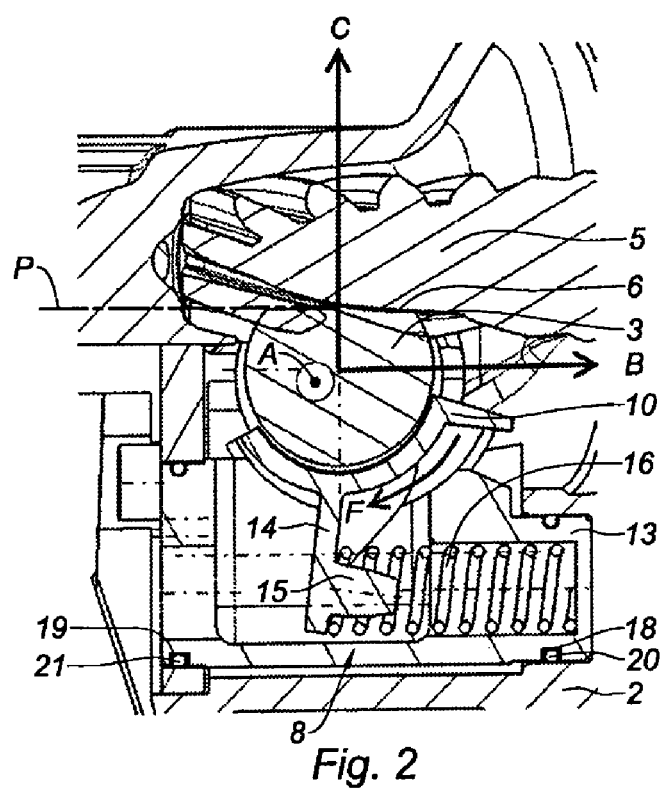
FIG. 2 is a cross-sectional view passing through the off-centred pusher device subject of the invention, the cross-sectional plane being perpendicular to the longitudinal axis of the rack.
Figure 4:
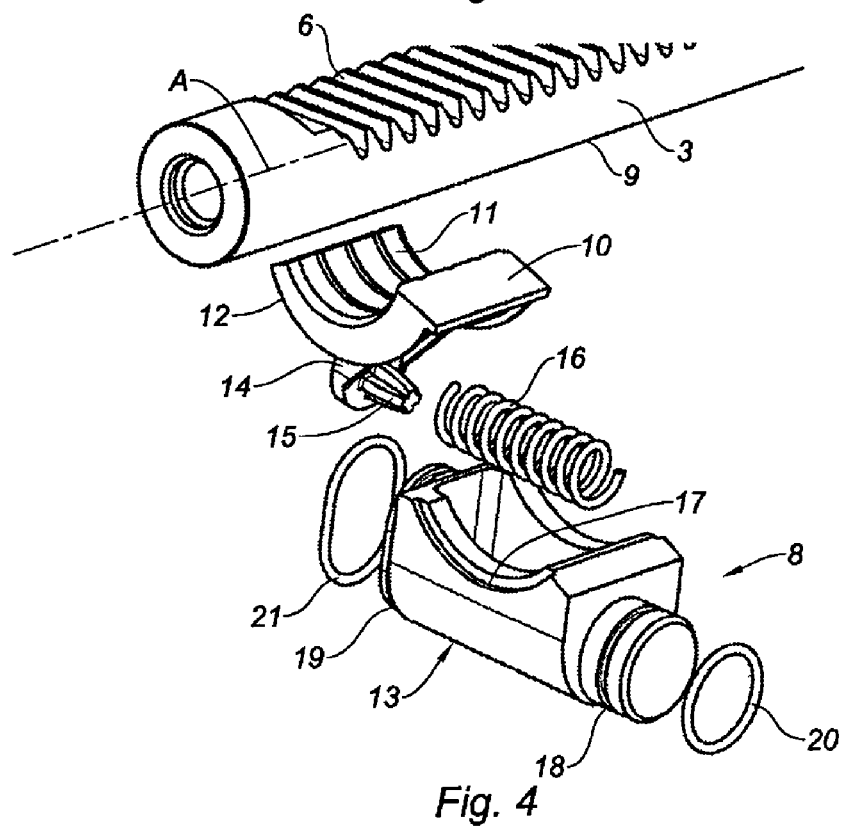
FIG. 4 is an exploded perspective view showing the components of this off-centred pusher device and a portion of the rack.

A pusher device generally designated under the reference number 8 is provided in the vicinity of the steering pinion 5 to press the teeth 6 of the rack 3 against the pinion 5, the pusher device 8 being shown in detail in FIGS. 2 and 4.

The pusher device 8 is positioned on the back side 9 of the rack 3, in other words on the side directed away from the teeth 6 of this rack 3 and also directed away from the pinion 5, this pusher device 8 being housed in a corresponding part of the steering housing 2.

The pusher device 8, of so-called off-centred type, as essential component comprises an eccentric support 10 which here is a part with rounded profile and more particularly a part which has an arched shape <<wedge-like>> shape. The support 10 has an inner periphery 11 in an arc of a circle which is off-centred relative to its outer periphery that is also in an arc of a circle. The inner periphery 11, thus off-centred from the support 10 comes to be applied against the back side of the rack 3.

The eccentric support 10 is mounted and guided on a casing 13 of general cylindrical shape which itself is guided in translation in the direction of an axis B parallel to the plane P of the teeth 6 of the rack 3, and orthogonal to the longitudinal axis A of this rack 3. The guiding in translation of the sliding casing 13 is ensured by a <<slide-type>> connection with the corresponding part of the steering housing 2.

The eccentric support 10 has a radial arm 14 which extends inside the sliding casing 13 and which, towards its outer end, carries a stud pin 15. A compression spring 13, housed in the casing 13, has one end bearing upon the inner wall of this casing 13, towards one of the ends of said casing, and another end engaged on the stud pin 15 of the radial arm 14.

Figure 3:
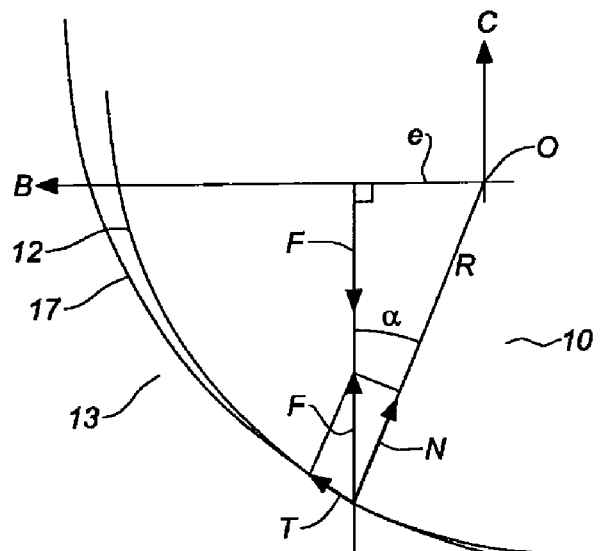
FIG. 3 schematically illustrates the irreversibility condition of this off-centred pusher device

The outer periphery 12 in an arc of a circle of the eccentric support 10 is applied and guided against a mating surface 17 belonging to the casing 13, so as to form a sliding contact which guides the eccentric support 10 in rotation about a centre of rotation O (see also FIG. 3). The action of the compression spring 16 on the eccentric support 10, exerted via the radial arm 14, translates as a rotation in clockwise direction as indicated by the arrow F in FIG. 2.

Finally, the sliding casing 13, towards it two ends, comprises respective annular grooves 18 and19, in which two respective O-rings 20 and 21 are mounted, also in contact with the inner wall of the steering housing 2. One of the ends of the sliding casing 13 is circular, as is the corresponding O-ring 20. The other end of the sliding casing 13 has cross-section of oblong shape as does the corresponding O-ring 21 so as to immobilize this sliding casing 13 in rotation—see in particular FIG. 4.

When in function, the eccentric support 10 sliding and rotating relative to the sliding casing 13 ensures the function of compensating for any play due to assembly and wear. Throughout the entire lifetime of the steering system under consideration, the spring 16 applies a force onto the eccentric support 10 causing it to rotate in the direction of the arrow F relative to the sliding casing 13 as soon as any play due to wear occurs between the rack 3 and the steering pinion 5. This allows compensation for all play due to wear, such play generating noise and vibrations.

The geometry of the eccentric support 10 and of the sliding casing 13 and the constituent materials of these components are chosen so as to guarantee irreversibility of the rotation of the eccentric support 10 relative to the sliding casing 13 i.e. the only permitted relative movement is rotation in the direction of the arrow F under the effect of the thrust of the spring 16, any rotation in the opposite direction (anti-clockwise direction) being made impossible irrespective of the load exerted by the rack 3 on the off-centred pusher.

To obtain said irreversibility the ratio between the value of eccentricity e and the radial distance, between the centre O of the outer periphery 12 of the eccentric support 10 and the contact point between this eccentric support 10 and the sliding casing 13, must be less than the value of the static friction coefficient between the eccentric support 10 and the sliding casing 13, at low eccentricity values.

This condition of irreversibility is illustrated by the schematic in FIG. 3 and corresponds to the relationship:

$$e/(R \cdot \cos(\alpha)) < f$$

i.e. for an angle $\alpha$ whose value is close to zero:

$$e/R < f$$

a formula in which:

e is the eccentricity value i.e. the minimum distance between the longitudinal axis of the inner periphery 11 of the eccentric support 10, in contact with the rack 3, and the longitudinal axis of the outer periphery 12 of the eccentric support 10, in contact with the sliding casing 13, R is the contact radius, in other words the distance between the centre O of the outer periphery 12 of the eccentric support 10 and the contact point, f is the coefficient of static friction between the two surfaces in contact.

The two O-rings 20 and 21 ensure the function of absorbing meshing defects of the steering pinion 5 with the teeth 6 of the rack 3. By means of these O-rings 20 and 21 meshing defects are absorbed along the following axes:

longitudinal axis A of the rack 3, axis B parallel to plane P of the teeth 6 of the rack 3, and orthogonal to the longitudinal axis A of this rack, axis C perpendicular to plane P of the teeth 6 of the rack.

The stiffness and the damping of the elastic elements, i.e. the O-rings 20 and 21, are chosen so as to allow controlled relative movement between the teeth of the steering pinion 5 and the teeth of the rack 3, to prevent impacts between these parts and the causing of noise and vibrations.

No departure would be made from the scope of the invention such as defined in the appended claims:

- by modifying details of form regarding the components of the device, such as the eccentric support and the sliding casing;
- by having recourse to any equivalents of the described means, in particular by replacing the compression spring acting on the eccentric support by a spring of another type such as a tension or torsion spring or a plate spring or a coil spring;
- by replacing the two O-rings by any other elastic element with damping properties such as a plate spring in suitable material or an elastomer block or a compression spring;
- by applying this pusher device to steering systems of all types which may possibly be manual steering or electric power steering or hydraulic power steering.

The invention claimed is:

1. Off-centred pusher device for motor vehicle rack steering system, said steering system comprising a steering housing and a rack slidingly mounted in said steering housing, the pusher device comprising a rotary support whose inner periphery is eccentric relative to an outer periphery, said support being urged in rotation in one direction by an elastic element, and being structured so that it is applied via its inner eccentric periphery against a back of the rack to press the latter towards teeth of the steering pinion, wherein the rotary support is mounted in rotation in a sliding casing which is slidingly connected with the steering housing so that said sliding casing is guided in translation in a direction substantially parallel to a plane of the teeth of the rack, and orthogonal to a longitudinal axis of this rack, the elastic element being arranged between a wall of the sliding casing and said rotary support with eccentric inner periphery to urge this support in rotation in a predefined direction, and other elastic means being arranged between the sliding casing and the steering housing to act on said casing.

2. The off-centred pusher device according to claim 1, wherein the elastic element urging said rotary support in rotation is formed of a compression spring, of which one end bears upon the inner wall of the sliding casing, and whose other end is engaged on a stud pin secured to a radial arm, itself secured to the rotary support with eccentric inner periphery.

3. The off-centred pusher device according to claim 1, wherein the elastic means arranged between the sliding casing and the steering housing are formed of at least one O-ring.

4. The off-centred pusher device according to claim 3, wherein two O-rings are provided, respectively mounted in annular grooves arranged towards the two ends of the casing.

5. The off-centred pusher device according to claim 4, wherein one end of the sliding casing has a cross-section of oblong shape, similar to the corresponding O-ring so as to immobilize this sliding casing in rotation.

6. The off-centred pusher device according to claim 1, wherein said rotary support and the sliding casing are structured to obtain irreversibility of rotation of said rotary support relative to the sliding casing.

7. The off-centred pusher device according to claim 1, wherein the rotary support with eccentric inner periphery does not fully surround the rack, the entire pusher device therefore being positioned on back side of the rack directed away from the steering pinion.

8. The off-centred pusher device of claim 6, wherein the irreversibility is obtained by structuring the ratio of eccentricity 'e' and the radial distance 'R' to be less than the value of static friction coefficient 'f' so that the following relation is satisfied:

$$e/R < f$$

wherein, the eccentricity 'e' is the minimum distance between the longitudinal axis of the inner periphery of the eccentric support which is in contact with the rack, and the longitudinal axis of the outer periphery of the eccentric support which is in contact with the sliding casing, the radial distance 'R' is the distance between the centre of the outer periphery of the eccentric support and the contact point, the static friction coefficient 'f' is the coefficient of static friction between the surface of the outer periphery of the eccentric support and the surface of the sliding casing in contact with the outer periphery surface.

9. A steering system for motor vehicle comprising a steering housing and a rack slidingly mounted in said steering housing, the steering system further comprising an off-centered pusher device which comprises a rotary support whose inner periphery is eccentric relative to an outer periphery, said support being urged in rotation in one direction by an elastic element, and being structured so that it is applied via its inner eccentric periphery against a back of the rack to press the latter towards teeth of the steering pinion, wherein the rotary support is mounted in rotation in a sliding casing which is slidingly connected with the steering housing so that said sliding casing is guided in translation in a direction substantially parallel to a plane of the teeth of the rack, and orthogonal to a longitudinal axis of this rack, the elastic element being arranged between a wall of the sliding casing and said rotary support with eccentric inner periphery to urge this support in rotation in a predefined direction, and other elastic means being arranged between the sliding casing and the steering housing to act on said casing.

\* \* \* \* \*